US012775387B2

(12) United States Patent
Kim et al.

(10) Patent No.: US 12,775,387 B2
(45) Date of Patent: Oct. 27, 2026

(54) MEMORY APPARATUS AND OPERATION METHOD THEREOF

(71) Applicant: Samsung Electronics Co., Ltd., Suwon-si (KR)

(72) Inventors: Taehoon Kim, Suwon-si (KR); Anil Kavala, Suwon-si (KR); Youngmin Jo, Suwon-si (KR); Chiweon Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/010,858

(22) Filed: Jan. 6, 2025

(65) Prior Publication Data

US 2025/0355568 A1 Nov. 20, 2025

(30) Foreign Application Priority Data

May 20, 2024 (KR) ........................ 10-2024-0065195

(51) Int. Cl.
*G06F 3/06* (2006.01)

(52) U.S. Cl.
CPC .......... *G06F 3/0614* (2013.01); *G06F 3/0659* (2013.01); *G06F 3/0673* (2013.01)

(58) Field of Classification Search
CPC .... G06F 3/0614; G06F 3/0659; G06F 3/0673; G11C 7/222; G11C 7/04; G11C 7/1078; G11C 16/10; G11C 16/32; G11C 2207/2254
USPC .................................................. 711/103, 102
See application file for complete search history.

(56) References Cited

U.S. PATENT DOCUMENTS

| | | | | |
|---|---|---|---|---|
| 8,019,957 | B1 * | 9/2011 | White | G11C 29/028 702/89 |
| 9,658,642 | B2 | 5/2017 | Mozak | |
| 10,324,490 | B2 | 6/2019 | Mozak | |
| 10,720,201 | B2 | 7/2020 | Hiraishi | |
| 11,550,498 | B2 | 1/2023 | Kim et al. | |
| 2015/0003574 | A1 | 1/2015 | Mozak | |
| 2020/0321039 | A1 * | 10/2020 | Kim | G11C 11/413 |
| 2021/0263660 | A1 * | 8/2021 | Pilolli | G11C 29/023 |
| 2022/0358061 | A1 | 11/2022 | Siliveri et al. | |

FOREIGN PATENT DOCUMENTS

| | | |
|---|---|---|
| KR | 10-2021-0136203 A | 11/2021 |
| KR | 10-2493268 B1 | 1/2023 |

* cited by examiner

*Primary Examiner* — Hosain T Alam
*Assistant Examiner* — Zubair Ahmed
(74) *Attorney, Agent, or Firm* — Fish & Richardson P.C.

(57) ABSTRACT

A memory apparatus and an operation method of a memory system, the memory apparatus including a first counter that outputs a first count value corresponding to a first delay time of a data strobe signal on a first path; a second counter that outputs a second count value corresponding to a second delay time of a data signal on a second path; a first comparator that outputs a first difference value therebetween; a first register that stores a delay reference value; a second comparator that outputs a second difference value therebetween; and a delay chain that adjusts a phase difference between the data signal and the data strobe signal based on the second difference value.

20 Claims, 10 Drawing Sheets

MEMORY APPARATUS AND OPERATION METHOD THEREOF

CROSS-REFERENCE TO RELATED APPLICATION(S)

This application claims the benefit of priority to Korean Patent Application No. 10-2024-0065195, filed on May 20, 2024, in the Korean Intellectual Property Office, the disclosure of which is incorporated herein by reference.

BACKGROUND

Some example embodiments of the present disclosure relate to memory apparatuses and operation methods thereof.

A semiconductor memory apparatus used for storing data may be adopted for various digital devices such as computers and mobile communication devices. Generally in memory apparatuses, a data signal (DQ) is identified based on a data strobe signal (DQS) which is applied together with the data signal (DQ). An input/output circuit for input and output of a memory apparatus may be categorized as a matched type, where the data signal (DQ) and the data strobe signal (DQS) are transmitted as controlled to have a constant phase difference, and an unmatched type where the data signal (DQ) and the data strobe signal (DQS) are transmitted without aligning phase difference. When using an unmatched-type input/output circuit, methods for controlling a phase difference between a data signal (DQ) and a data strobe signal (DQS) may be developed to improve the reliability of a memory apparatus.

SUMMARY

Some example embodiments of the inventive concepts provide a memory apparatus having improved reliability by compensating for skew as the memory apparatus controls a phase difference between a data signal and a data strobe signal independently without help or involvement of a memory controller after initial skew training is completed, and an operation method thereof.

Some example embodiments are not limited to the technical features described above, and other technical features may be inferred from the some example embodiments described hereinafter.

Some example embodiments provide a memory apparatus including a first counter that outputs a first count value corresponding to a first delay time of a data strobe signal on a first path; a second counter that outputs a second count value corresponding to a second delay time of a data signal on a second path; a first comparator that outputs a first difference value based on comparison of the first count value and the second count value; a first register that stores a delay reference value; a second comparator that outputs a second difference value based on comparison of the first difference value and the delay reference value; and a delay chain that adjusts a phase difference between the data signal and the data strobe signal based on the second difference value.

Some example embodiments further provide a memory system including a memory controller that provides a data signal and a data strobe signal; and a memory apparatus that processes the data signal and the data strobe signal provided by the memory controller. The memory apparatus may include a first counter that outputs a first count value corresponding to a first delay time of the data strobe signal on a first path; a second counter that outputs a second count value corresponding to a second delay time of the data signal on a second path; a first comparator that outputs a first difference value based on comparison of the first count value and the second count value; a first register that stores a delay reference value; a second comparator that outputs a second difference value based on comparison of the first difference value and the delay reference value; and a delay chain that adjusts a phase difference between the data signal and the data strobe signal based on the second difference value.

Some example embodiments still further provide an operation method of a memory apparatus, the operation method including identifying a first count value corresponding to a first delay time of a data strobe signal on a first path and a second count value corresponding to a second delay time of a data signal on a second path; identifying a first difference value based on comparison of the first count value and the second count value; identifying a second difference value based on comparison of the first difference value and the delay reference value; and adjusting a phase difference between the data signal and the data strobe signal based on the second difference value.

Some example embodiments further provide a non-transitory computer-readable recording medium having instructions stored thereon that when executed by a processor perform the operation method of the memory apparatus.

Some other example embodiments will be set forth in part in the description which follows and, in part, will be apparent from the description, or may be learned by practice of the disclosure.

According to some example embodiments, it is possible to improve the accuracy of a data write operation by controlling a phase difference between a data signal and a data strobe signal within a memory apparatus without the involvement of a memory controller and compensating for skew.

Further, according to some example embodiments, it is possible to improve the accuracy of a data write operation by maintaining a constant phase difference between a data signal and a data strobe signal even when a transmission speed of a signal varies depending on a change in temperature or operating voltage of a memory apparatus.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

BRIEF DESCRIPTION OF THE DRAWINGS

These above noted and/or other aspects, features, and advantages of the inventive concepts will become apparent and more readily appreciated from the following description of some example embodiments, taken in conjunction with the accompanying drawings of which.

DETAILED DESCRIPTION

Terms used in the following description of in some example embodiments are selected from currently widely used general terms when possible while considering the functions in the present disclosure. However, the terms may vary depending on the intention of a person skilled in the art, precedents, the emergence of new technology, and the like. Further, in certain cases, terms may also be arbitrarily selected by the applicant, and their meaning will be described in detail in the corresponding descriptions. Therefore, the terms used in the present disclosure are not to be construed simply as their designation but based on the meaning of the terms and the overall context of the present disclosure.

Throughout the specification, when a part is described as "comprising or including" a component, it does not exclude another component but may further include another component unless otherwise stated. Furthermore, terms such as ". . . unit," ". . . part," and ". . . module" described in the specification may mean a unit that processes at least one function or operation, which may be implemented as hardware, software, or a combination thereof.

Hereinafter, some example embodiments of the present disclosure will be described in detail with reference to the accompanying drawings so that one of ordinary skill in the art to which the present disclosure pertains may easily implement them. However, the present disclosure may be implemented in multiple different forms and is not limited to the some example embodiments described herein.

Figure 1:
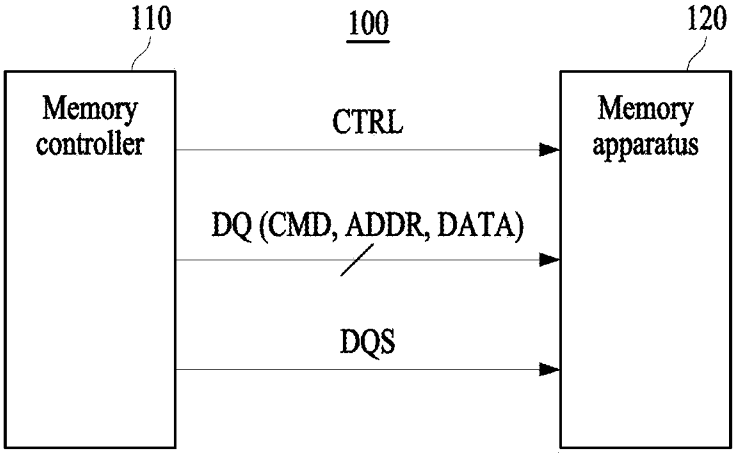
FIG. 1 is a diagram illustrating a memory system according to some example embodiments of the inventive concepts.

FIG. 1 is a diagram for illustrating a memory system according to some example embodiments.

Referring to FIG. 1, a memory system 100 according to some example embodiments may include a memory controller 110 and a memory apparatus 120. For example, each of the memory controller 110 and the memory apparatus 120 may be provided as one chip, one package, or one module.

According to some example embodiments, the memory controller 110 may store data in the memory apparatus 120 or read stored data from the memory apparatus 120. For example, the memory apparatus 120 may receive a command CMD and an address ADDR from the memory controller 110, access an area selected by the address ADDR in a memory cell array that forms the memory apparatus 120, and perform an operation instructed by the command CMD for the area selected by the address ADDR. For example, the memory apparatus 120 may store data DATA in an area selected by the address ADDR in a write operation, and the memory apparatus 120 may read data from the area selected by the address ADDR in a read operation.

According to some example embodiments, the memory controller 110 may provide a control signal CTRL and a data strobe signal DQS to the memory apparatus 120. For example, each of the control signal CTRL, the data strobe signal DQS, and a plurality of data signals DQ may be provided to the memory apparatus 120 through a different signal line or a different signal pin. In some example embodiments, the control signal CTRL and the data strobe signal DQS may be signals for sorting signals (for example, the command CMD, the address ADDR, or the data DATA) provided to the memory apparatus 120 through the plurality of data signals DQ.

According to some example embodiments, the memory apparatus 120 may operate in response to signals transmitted from the memory controller 110. For example, the memory apparatus 120 may sort whether a signal provided through the data signals DQ is the command CMD, the address ADDR, or the data DATA based on the control signal CTRL. In some example embodiments, the control signal CTRL may include a chip enable signal, a command latch enable signal, an address latch enable signal, a read enable signal, or a write enable signal.

According to some example embodiments, the memory apparatus 120 may include NAND flash memory. However, some example embodiments of the present disclosure are not limited thereto. The memory apparatus 120 may include at least one of volatile or non-volatile memories such as NAND flash memory connected to a frequency boosting interface (FBI) chip, dynamic random access memory (DRAM), static RAM (SRAM), synchronous DRAM (SDRAM), read-only memory (ROM), programmable ROM (PROM), electrically programmable ROM (EPROM), electrically erasable and programmable ROM (EEPROM), phase-change RAM (PRAM), magnetic RAM (MRAM), resistive RAM (RRAM), and ferroelectric RAM (FRAM).

Figure 2:
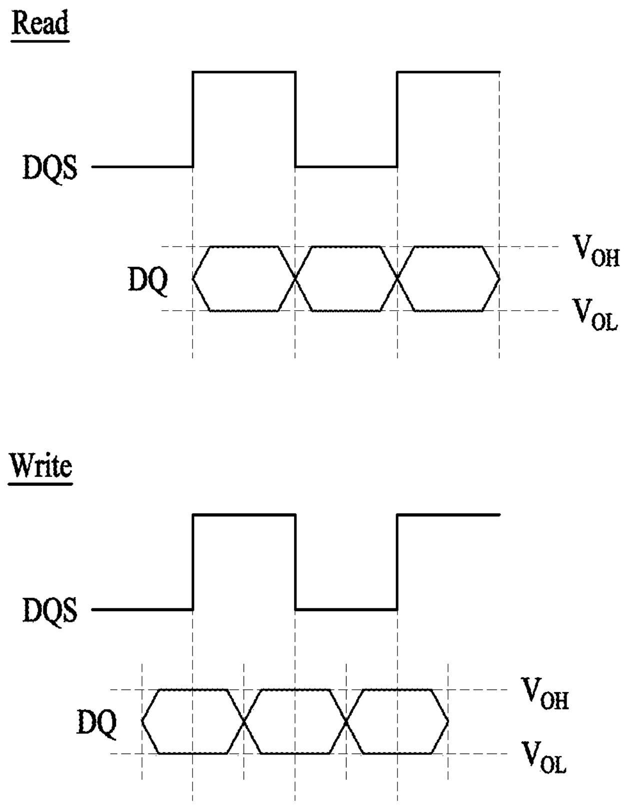
FIG. 2 is a diagram illustrating a relationship between a data signal and a data strobe signal in a read operation and a write operation according to some example embodiments.

FIG. 2 is a diagram illustrating a relationship between a data signal and a data strobe signal in a read operation and a write operation according to some example embodiments.

Referring to FIG. 2, when the memory apparatus 120 performs a read operation, the data signal DQ and the data strobe signal DQS may be outputted with an identical phase from an input/output circuit. When the memory apparatus 120 performs a write operation, the data strobe signal DQS is inputted through a buffer and thus may be inputted with delay to the input/output circuit, compared to the data signal DQ. For example, since a value of the data signal DQ at a rising edge or a falling edge of the data strobe signal DQS is sampled and stored in the memory apparatus 120, when the rising edge or the falling edge of the data strobe signal DQS is aligned in the middle of the data signal DQ, the data signal DQ may be more precisely sampled.

For a more precise sampling of the data signal DQ, a matched-type input/output circuit may control a phase difference between the data signal DQ and the data strobe signal DQS to maintain a constant value. For example, in order for delay times of the data signal DQ and the data strobe signal DQS due to signal transmission within the memory apparatus 120 to be identical, a path where the data signal DQ is transmitted may identically include a repeater RPT or a buffer included in a path where the data strobe signal DQS is transmitted. For example, since the data signal DQ and the data strobe signal DQS are transmitted through paths consisting of an identical circuit from a time point when the two signals are received from the memory apparatus 120 to a time point when the signals are sampled in a sense amplifier SA, the phase difference between the data signal DQ and the data strobe signal DQS may maintain a constant value.

An unmatched-type input/output circuit may improve the power efficiency of the memory apparatus 120 as an unnecessary repeater or buffer is removed from a path where the data signal DQ is transmitted. However, since a phase difference between the data signal DQ and the data strobe signal DQS is not controlled to be a constant value during data sampling in the unmatched-type input/output circuit, the data signal DQ is not sampled at an exact position when the phase difference varies, which may lower the reliability of the memory apparatus 120. An example of when a phase difference between the data signal DQ and the data strobe signal DQS is out of (e.g., different than) a preset (and/or alternatively a desired) value is described with reference to FIG. 3.

Figure 3:
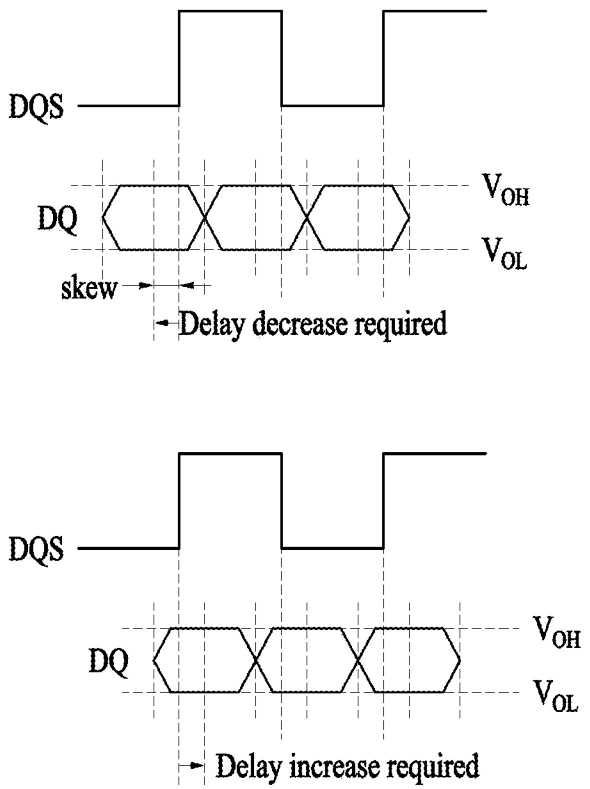
FIG. 3 is a diagram illustrating a relationship between a data signal and a data strobe signal in a write operation of an unmatched-type input/output circuit according to some example embodiments.

FIG. 3 is a diagram illustrating a relationship between a data signal and a data strobe signal in a write operation of an unmatched-type input/output circuit according to some example embodiments.

Referring to FIG. 3, examples of when a phase difference between the data signal DQ and the data strobe signal DQS is out of a preset value due to various factors are illustrated.

As described above, when the memory apparatus 120 performs a write operation, the data signal DQ may be precisely sampled and the reliability of the memory apparatus 120 may be improved as the data signal DQ and the data strobe signal DQS have a phase difference of 90 degrees, such as for example as a rising edge or a falling edge of the data strobe signal DQS is aligned in the middle of the data signal DQ. However, a transmission speed of a signal within a memory apparatus may vary due to factors such as process, voltage, and temperature, which may lead to jitter indicating that the data signal DQ or the data strobe signal DQS are not transmitted as having a desired phase therebetween.

For example, due to a difference in processes of manufacturing elements, the transmission speed of a signal passing through corresponding elements may vary. As an example, due to a difference in manufacturing processes of an n-type metal-oxide semiconductor (NMOS) or a p-type metal-oxide semiconductor (PMOS), the switching speed of a transistor may vary, and consequently, each NMOS or each PMOS may have a different signal transmission speed. Thus, all elements within the memory apparatus 120 may each have a unique signal transmission property due to differences in manufacturing processes, which may cause jitter to a signal passing through the memory apparatus 120.

As another example, when the operating voltage of the memory apparatus 120 increases, the transmission speed of a signal within the memory apparatus 120 may increase because the increasing operating voltage increases the operation speed of a transistor. As another example, elements consisting of the memory apparatus 120 may be designed to secure an optimum operation within a desired (and/or alternatively predetermined) temperature range, but when out of the temperature range, the speed of electrons increases within the elements, which may result in decreasing a signal transmission speed. Electrical properties such as the impedance of a circuit consisting of the memory apparatus 120 may change depending on the temperature of the memory apparatus 120, which may make the transmission speed of a signal vary.

Thus, when the transmission speed of the data signal DQ or the data strobe signal DQS within the memory apparatus 120 may vary due to a difference in properties of processes for elements included in the memory apparatus 120 or a change in operating voltage or temperature, the phase difference between the data signal DQ and the data strobe signal DQS in the write operation of the memory apparatus 120 may be out of a preset value (for example, 90 degrees). As such, a degree to which a phase difference between the data signal DQ and the data strobe signal DQS is out of a preset value is referred to as skew.

As described above, a phase difference between the data signal DQ and the data strobe signal DQS should be maintained at a preset value for stable operation of the memory apparatus 120. Therefore, when it is determined that skew is caused between the data signal DQ and the data strobe signal DQS, the skew may be compensated by controlling a phase difference between the two signals. For example, as illustrated in FIG. 3, when a phase difference between the data signal DQ and the data strobe signal DQS is greater than a preset value, skew may be compensated so that the phase difference between the data signal DQ and the data strobe signal DQS is the preset value by decreasing a delay time of the data strobe signal DQS within the memory apparatus 120. Conversely, as illustrated in FIG. 3, when a phase difference between the data signal DQ and the data strobe signal DQS is less than a preset value, skew may be compensated so that the phase difference between the data signal DQ and the data strobe signal DQS is the preset value by increasing a delay time of the data strobe signal DQS within the memory apparatus 120.

With regard thereto, general memory apparatuses may measure a delay time of the data strobe signal DQS within a memory apparatus based on a replica circuit which replicates a path of the data strobe signal DQS and may transmit information thereabout to a memory controller. When a delay time according to a path through which the data strobe signal DQS is transmitted is out of a preset range, the memory controller may determine that a phase difference between the data signal DQ and the data strobe signal DQS is out of a preset value and skew is caused and may perform a re-training operation of controlling the phase difference between the data signal DQ and the data strobe signal DQS to be the preset value and compensating for the skew. However, since the memory controller may not perform operations other than re-training while the memory controller performs the re-training operation, a memory system may not be used for reading or writing data during re-training.

General memory apparatuses may measure a delay time of the data strobe signal DQS within a memory apparatus based on a replica circuit which replicates a path of the data strobe signal DQS and may determine whether to compensate for skew based on information thereabout alone. Therefore, a delay time of the data signal DQ which may also vary with a change in operating voltage or temperature of a memory apparatus in practice may not be considered.

With regard thereto, some example embodiments of the present disclosure provide the memory system 100 which compensates for skew further based on a delay time of the data signal DQ, in addition to a delay time of the data strobe signal DQS within the memory apparatus 120. Some example embodiments of the present disclosure provide the memory system 100 which may resolve the memory system 100 not being available for reading or writing data during re-training by allowing a phase difference between the data signal DQ and the data strobe signal DQS to be controlled within the memory apparatus 120 without the involvement of the memory controller 110 after an initial training process.

Figure 4:
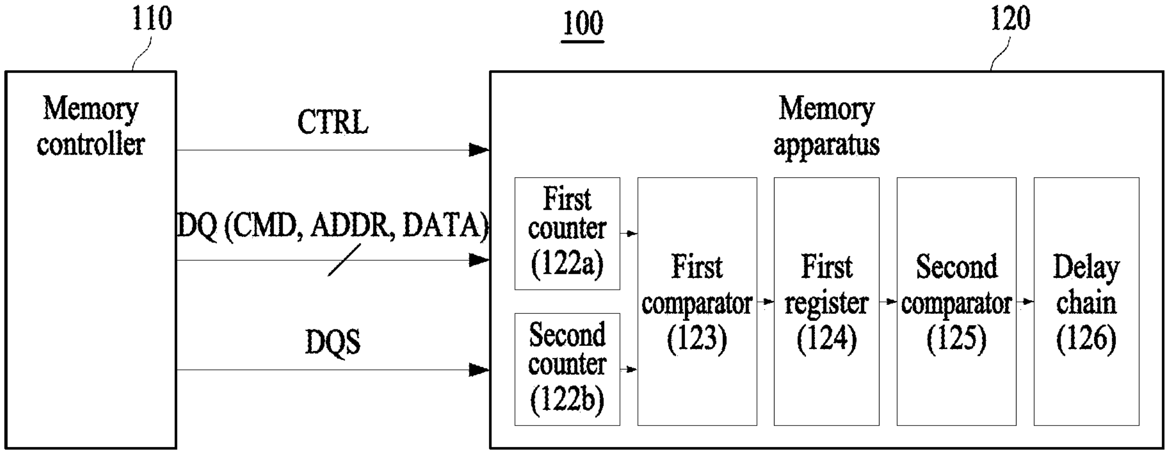
FIG. 4 is a diagram illustrating a memory system in more detail according to some example embodiments of the present disclosure.

FIG. 4 is a diagram illustrating a memory system in more detail according to some example embodiments of the present disclosure.

For example, FIG. 4 is a diagram illustrating the memory system 100 which may compensate for skew as the memory apparatus 120 controls a phase difference between the data signal DQ and the data strobe signal DQS according to some example embodiments of the present disclosure. Referring to FIG. 4, the memory apparatus 120 may include a first counter 122*a*, a second counter 122*b*, a first comparator 123, a first register 124, a second comparator 125, and a delay chain 126.

According to some example embodiments, the first counter 122*a* may measure a first delay time on a first path where the data strobe signal DQS is transmitted until a time point of sampling the data signal DQ after the data strobe signal DQS is transmitted to the memory apparatus 120. In some example embodiments, a first count value output from the first counter 122*a* may increase by 1 every time a signal passes through the first path and may identify the first delay time based on an increasing amount of the first count value for a preset period. For example, the memory apparatus 120 may identify a value of dividing the preset period by the increasing amount of the first count value as the first delay time. According to some example embodiments, the memory apparatus 120 may also identify (e.g., determine) the preset period by the first count value as the first delay time by initializing the first counter 122*a* for each preset period.

According to some example embodiments, the second counter 122*b* may measure a second delay time on a second path where the data signal DQ is transmitted until a time point of sampling the data signal DQ after the data signal DQ is transmitted to the memory apparatus 120. For example, a second count value output from the second counter 122*b* may increase by 1 every time a signal passes through the second path and may identify the second delay time based on an increasing amount of the second count value for a preset period. For example, the memory apparatus 120 may identify a value of dividing the preset period by the increasing amount of the second count value as the second delay time. According to some example embodiments, the memory apparatus 120 may also identify (e.g., determine) the preset period by the second count value as the second delay time by initializing the second counter 122*b* for each preset period.

According to some example embodiments, the first comparator 123 may compare the first count value and the second count value and output a first difference value. For example, the memory apparatus 120 may determine a value of subtracting the first count value from the second count value as the first difference value. Generally, since a path where the data strobe signal DQS is transmitted is longer than a path where the data signal DQ is transmitted, the value of subtracting the first count value from the second count value may be determined as the first difference value so that the first difference value is a positive number.

According to some example embodiments, the first register 124 may be a register that stores a delay reference value. In some example embodiments, the delay reference value may be determined as a difference between the first count value and the second count value when a phase difference between the data signal DQ and the data strobe signal DQS is controlled to be a preset value (for example, 90 degrees) by the memory controller 110. For example, the delay reference value may include information about a delay time on paths of the data signal DQ and the data strobe signal DQS when a rising edge or a falling edge of the data strobe signal DQS is controlled to be aligned in the middle of the data signal DQ at a time point of sampling data by the memory controller 110.

According to some example embodiments, a second comparator 125 may compare the delay reference value stored in the first register 124 and the first difference value outputted from the first comparator 123 and identify a second difference value. When the second difference value is 0, which indicates that the first difference value is identical to the delay reference value, the memory apparatus 120 may determine that no skew is caused between the data signal DQ and the data strobe signal DQS. When the second difference value is not 0, which indicates that the first difference value is different from the delay reference value, the memory apparatus 120 may determine that skew is caused between the data signal DQ and the data strobe signal DQS.

According to some example embodiments, the memory apparatus 120 may control the delay chain 126 to control a phase difference between the data signal DQ and the data strobe signal DQS based on the second difference value to compensate for skew. For example, the memory apparatus 120 may determine whether to increase or decrease a delay time of the data strobe signal DQS based on the second difference value and, by adjusting the delay time of the data strobe signal DQS by the delay chain 126 based thereon, may control (e.g., adjust) the phase difference between the data signal DQ and the data strobe signal DQS to have a preset value. An example structure of the delay chain 126 and an operation of controlling a delay time of the data strobe signal DQS by the delay chain 126 based on the second difference value are described below with reference to FIGS. 6A-6C.

Thus, by determining whether to increase or decrease a delay time of the data strobe signal DQS based on both a transmission path of the data signal DQ and a transmission path of the data strobe signal DQS within the memory apparatus 120, the memory apparatus 120 according to some example embodiments of the present disclosure may more precisely control (e.g., adjust) a phase difference and compensate for skew, which may increase the reliability of the memory apparatus 120. The memory apparatus 120 may compensate for skew without involvement of the memory controller 110 by determining whether to compensate for skew using the delay reference value stored in the first register 124 therein and adjusting a delay time of the data strobe signal DQS by the delay chain 126. Therefore, unlike general memory systems, the memory controller may not need to perform a re-training operation, and data read and write operations of the memory apparatus 110 are not interrupted due to the re-training operation, thereby increasing the efficiency of the memory apparatus.

Further, since the memory system 100 according to some example embodiments of the present disclosure may compensate for skew even without the involvement of the memory controller 110, the memory apparatus 120 may independently perform skew compensation, even in the case of NAND flash memory connected to an FBI chip which may not determine whether a delay time of the data strobe signal DQS changes from a reference value or perform an operation for controlling (e.g., adjusting) a phase difference between the data signal DQ and the data strobe signal DQS based thereon because information on the delay time of the data strobe signal DQS may not be transmitted from the memory apparatus 120 to the memory controller 110. Since DRAM has the same circuit structure where the data strobe signal DQS is transmitted as NAND flash memory, a skew compensation manner as described above and below may be identically applied to DRAM.

According to some example embodiments of the present disclosure, a process, by the memory apparatus 120, of identifying whether skew occurs between the data signal DQ and the data strobe signal DQS and controlling a phase difference between the data signal DQ and the data strobe signal DQS using the delay chain 126 based thereon is hereinafter described in detail.

Figure 5:
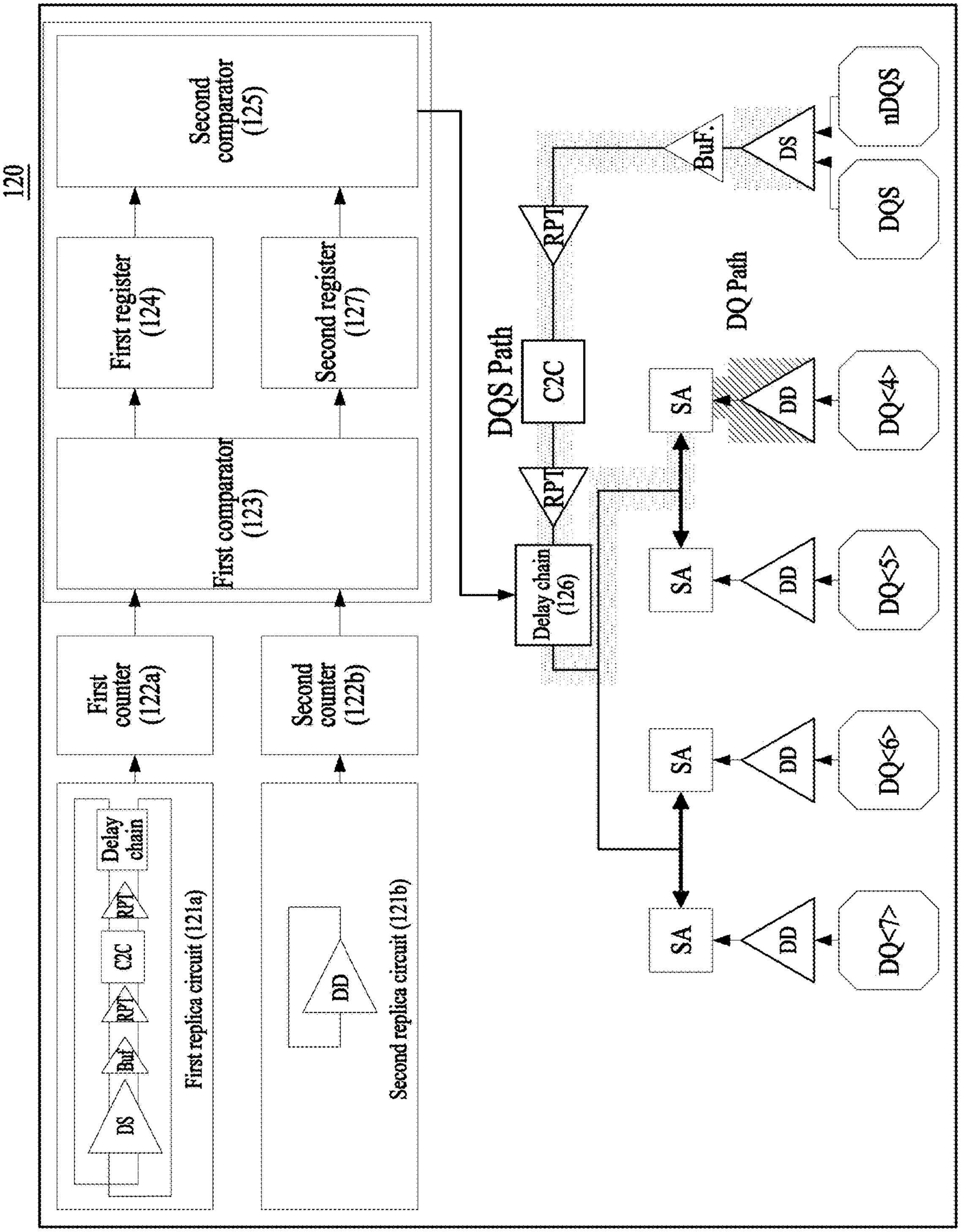
FIG. 5 is a diagram illustrating a memory apparatus in more detail according to some example embodiments.

FIG. 5 is a diagram illustrating a memory apparatus in more detail according to some example embodiments of the present disclosure.

For example, FIG. 5 is a diagram illustrating a whole process related to an operation of controlling a phase difference between the data signal DQ and the data strobe signal DQS by the memory apparatus 120 according to some example embodiments of the present disclosure.

Referring to FIG. 5, the memory apparatus 120 according to some example embodiments may include a first replica circuit 121*a*, a second replica circuit 121*b*, the first counter 122*a*, the second counter 122*b*, the first comparator 123, the first register 124, the second comparator 125, and the delay chain 126 and may further include a second register 127. The first counter 122*a*, the second counter 122*b*, the first comparator 123, the first register 124, the second comparator 125, and the delay chain 126 of FIG. 5 may correspond to and be the same as the first counter 122*a*, the second counter 122*b*, the first comparator 123, the first register 124, the second comparator 125, and the delay chain 126 of FIG. 4, respectively, and thus duplicate descriptions are omitted.

According to some example embodiments, the first replica circuit 121*a* may be a replica circuit corresponding to a first path (e.g., the DQS path) where the data strobe signal DQS is transmitted within the memory apparatus 120. For example, the first replica circuit 121*a* may be a circuit replicating a path (e.g., the first path) through which the data strobe signal DQS transmitted from the memory controller 110 is received in the memory apparatus 120 and transmitted to a sense amplifier SA. According to some example embodiments, a path (e.g., the first path) where the data strobe signal DQS is transmitted may include a buffer circuit DS including at least one of a data strobe signal buffer and an additional buffer circuit Buf for receiving the data strobe signal DQS from the memory controller 110, and a phase splitter (not shown) for splitting the data strobe signal DQS passing through the buffer and outputting a plurality of the split data strobe signals DQS. According to some example embodiments, the path where the data strobe signal DQS is transmitted may include at least one of the repeater RPT for amplifying signals to limit and/or prevent distortion or reduction of a transmitted signal when a transmission distance of a signal grows long, and a common mode logic-to-complementary metal oxide semiconductor (CML-to-CMOS) converter C2C for converting from analog signals to digital signals. In some example embodiments, the phase splitter may split, but is not limited to, the data strobe signal DQS into four signals each having a phase difference of 90 degrees therebetween, that is, a reference signal and three signals having phase differences of 90 degrees, 180 degrees, and 270 degrees for the reference signal and may split the data strobe signal DQS into any number so as to provide the split data strobe signal DQS as having a desired period based on a clock period and a period of the data strobe signal DQS.

As illustrated in FIG. 5, the data signal DQ may include data consisting of a plurality of bits (for example, 8 bits), and some bits (for example, 4 bits) thereof may be data to be stored in the memory apparatus 120. According to some example embodiments, the second replica circuit 121*b* may be a replica circuit corresponding to a second path (e.g., the DQ path) through which the data signal DQ is transmitted within the memory apparatus 120. For example, the second replica circuit 121*b* may be a circuit replicating a path (e.g., the second path) where a bit (for example, DQ<4> to DQ<7> of FIG. 5) of the data signal to be stored in the memory apparatus 120 in the data signal DQ transmitted from the memory controller 110 is received by the memory apparatus 120 and transmitted to a sense amplifier SA. According to some example embodiments, a path (e.g., the second path) where the data signal DQ is transmitted may include a buffer circuit DD including at least one of a data signal buffer for receiving the data signal DQ from the memory controller 110 and a decision feedback equalization (DFE) circuit (not shown) for compensating for signals without amplifying a noise level. In some example embodiments, the DFE circuit may consist of a plurality of tabs, and the output of the DFE circuit may be determined based on the sum of outputs for each tab based on a weight of each of the plurality of tabs. The data strobe signal DQS and the data signal DQ are transmitted through each path to the sense amplifier SA within the memory apparatus 120, and the data signal DQ is sampled based on the data strobe signal DQS in the sense amplifier SA. For example, a value of the data signal DQ at a rising edge or a falling edge of the data strobe signal DQS may be sampled, and whether the value of the data signal DQ is 0 or 1 may be determined, and an operation according to the determination may be performed.

According to some example embodiments, the first counter 122*a* may output a first count value corresponding to a first delay time of the data strobe signal DQS on the first path based on the first replica circuit 121*a*. For example, an output value of the first counter 122*a* may increase by 1 every time a signal passes through the first replica circuit 121*a* once, and the memory apparatus 120 may measure the first delay time of the signal according to the first replica circuit 121*a* based on an increasing amount of the output value of the first counter 122*a* for a preset period. As described above, the first replica circuit 121*a* may be a circuit replicating a path of the data strobe signal DQS within the memory apparatus 120, and accordingly, the first delay time may represent a delay time of the data strobe signal DQS on the path where the data strobe signal DQS is transmitted within the memory apparatus 120.

Similarly, the second counter 122*b* may output a second count value corresponding to a second delay time of the data signal DQ on the second path based on the second replica circuit 121*b*. For example, an output value of the second counter 122*b* may increase by 1 every time a signal passes through the second replica circuit 121*b* once, and the memory apparatus 120 may measure the second delay time of the signal according to the second replica circuit 121*b* based on an increasing amount of the output value of the second counter 122*b* for a preset period. As described above, the second replica circuit 121*b* may be a circuit replicating a path of the data signal DQ within the memory apparatus 120, and accordingly, the second delay time may represent a delay time of the data signal DQ on the path where the data signal DQ is transmitted within the memory apparatus 120.

According to some example embodiments, the first comparator 123 may compare the first count value and the second count value and output a first difference value. For example, the memory apparatus 120 may determine a value of subtracting the first count value from the second count value as the first difference value. Outputs of the first comparator 123 may be stored in the first register 124 during skew training for determining a delay reference value and may be stored in the second register 127 after skew training. When the second register 127 is not included in the memory apparatus 120, the output of the first comparator 123 after skew training may be directly transmitted to the second comparator 125.

According to some example embodiments, the first register 124 may be a register that stores a delay reference value. As described above, the delay reference value may be determined as a difference between the first count value and the second count value when a phase difference between the data signal DQ and the data strobe signal DQS is controlled to be a preset value by the memory controller 110.

According to some example embodiments, the second comparator 125 may compare the delay reference value stored in the first register 124 and the first difference value and identify a second difference value. For example, the second comparator 125 may output a value based on subtracting the first difference value from the delay reference value as the second difference value. As described above, when the first difference value is stored in the second register 127, the second comparator 125 may read the delay reference value and the first difference value from the first register 124 and the second register 127, respectively, and output the second difference value. When the second register 127 for storing the first difference value is not included in the memory apparatus 120, the second comparator 125 may read the delay reference value from the first register 124 and receive the first difference value which is an output value from the first comparator 123, and thus, may output the second difference value.

According to some example embodiments, the memory apparatus 120 may control a phase difference between the data signal DQ and the data strobe signal DQS based on the second difference value to compensate for skew. For example, when the second difference value is 0, which indicates that the first difference value is identical to the delay reference value, the memory apparatus 120 may determine that no skew is caused between the data signal DQ and the data strobe signal DQS, since when the second difference value is not 0 indicates that the first difference value is different from the delay reference value, the memory apparatus 120 may determine that skew is caused between the data signal DQ and the data strobe signal DQS. Therefore, the memory apparatus 120 may determine whether to increase or decrease a delay time of the data strobe signal DQS depending on whether the second difference value is a positive number or a negative number. By adjusting the delay time of the data strobe signal DQS by the delay chain 126, the memory apparatus 120 may control the phase difference between the data signal DQ and the data strobe signal DQS to have a preset value. An example of implementing the delay chain 126 is described below with reference to FIGS. 6A-6C.

Figure 6A:
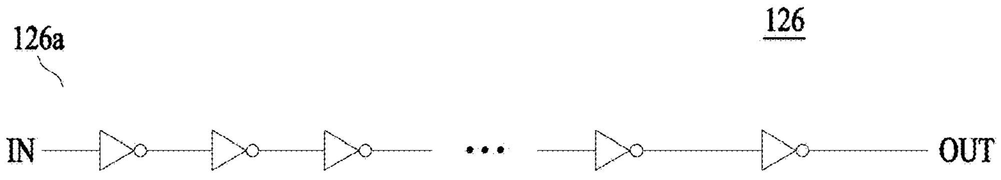
FIGS. 6A, 6B and 6C are diagrams illustrating examples of a delay chain according to some example embodiments.
Figure 6B:
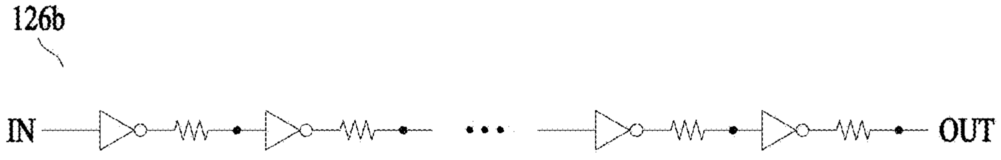
Figure 6C:
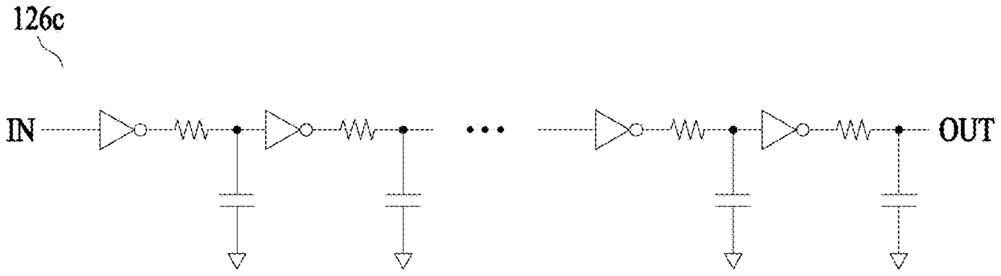

FIGS. 6A-6C are diagrams illustrating examples of a delay chain according to some example embodiments.

Referring to FIG. 6A, a delay chain 126*a* may include a plurality of inverters. According to some example embodiments, the memory apparatus 120 may determine the number of inverters from among the plurality of inverters included in the delay chain 126*a* that the data strobe signal DQS bypasses to adjust a delay time of the data strobe signal DQS by the delay chain 126*a*.

For example, when the second difference value is a positive number, the memory apparatus 120 may decrease the number of inverters from among the plurality of inverters included in the delay chain 126*a* that the DQS bypasses to increase a delay time of the data strobe signal DQS through the delay chain 126*a*. When the delay time of the data strobe signal DQS through the delay chain 126*a* increases, a delay time of the data strobe signal DQS on the first path increases within the memory apparatus 120, and thus the number of times in which a signal passes through the first replica circuit 121*a* for a preset period decreases, which decreases the first count value. Since the second count value is maintained without change, the first difference value based on subtracting the first count value from the second count value increases, and the second difference value based on subtracting the first difference value from the delay reference value decreases. As such, the memory apparatus 120 may adjust the number of inverters to bypass among the plurality of inverters included in the delay chain 126*a* to control the second difference value to be 0. When the second difference value becomes 0, a phase difference between the data signal DQ and the data strobe signal DQS is adjusted to a preset value, thereby compensating for skew.

In contrast, when the second difference value is a negative number, the memory apparatus 120 may increase the number of inverters from among the plurality of inverters included in the delay chain 126*a* that the DQS signal bypasses to decrease a delay time of the data strobe signal DQS through the delay chain 126*a*. When the delay time of the data strobe signal DQS through the delay chain 126*a* decreases, a delay time of the data strobe signal DQS on the first path decreases within the memory apparatus 120, and thus the number of times in which a signal passes through the first replica circuit 121*a* for a preset period increases, which increases the first count value. Since the second count value is maintained without change, the first difference value based on subtracting the first count value from the second count value decreases, and the second difference value based on subtracting the first difference value from the delay reference value increases. As such, the memory apparatus 120 may adjust the number of inverters to bypass among the plurality of inverters included in the delay chain 126*a* to control the second difference value to be 0. When the second difference value becomes 0, a phase difference between the data signal DQ and the data strobe signal DQS is adjusted to a preset (e.g., desired) value, thereby compensating for skew.

According to some example embodiments, the delay chain 126 may further include a plurality of resistance and/or capacitor elements in addition to the plurality of inverters. For example, in some example embodiments a delay chain 126*b* may include a plurality of inverters and a plurality of resistance elements as shown in FIG. 6B. In some other example embodiments, a delay chain 126*c* may include a plurality of inverters, a plurality of resistance elements, and a plurality of capacitor elements as shown in FIG. 6C. When a delay chain includes a passive element, like the delay chain 126*b* and the delay chain 126*c*, a delay time of a signal passing through the delay chain may be determined further based on characteristic values of the passive elements and the number of inverters from among a plurality of inverters that the signal bypasses.

Figure 7:
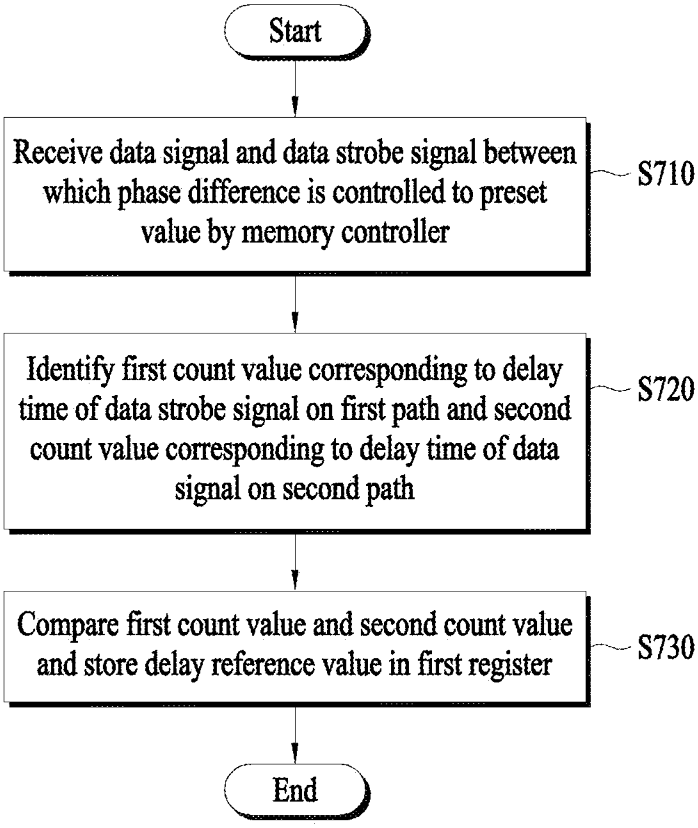
FIGS. 7 and 8 are diagrams illustrating an operation of a memory apparatus during skew training according to some example embodiments.
Figure 8:
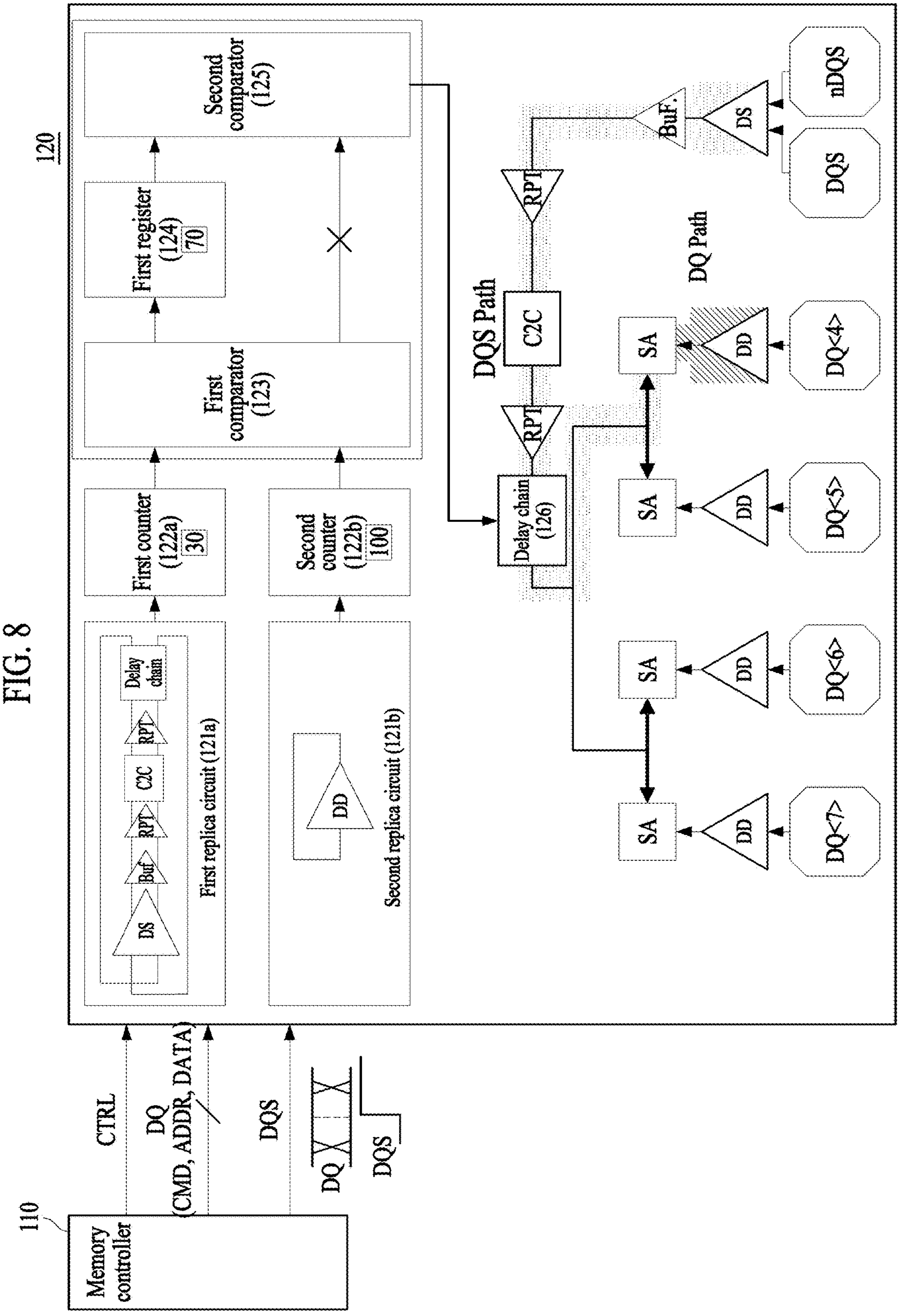

FIGS. 7 and 8 are diagrams illustrating an operation of a memory apparatus during skew training according to some example embodiments. For example, FIG. 7 is a flowchart showing an operation method of the memory apparatus 120 during skew training for determining a delay reference value. FIG. 8 is a diagram illustrating operations of the memory controller 110 and the memory apparatus 120 during skew training and examples of output values of the first counter 122*a*, the second counter 122*b*, and the first comparator 123 of the memory apparatus 120 and a delay reference value stored in the first register 124.

Referring to FIG. 7, in operation S710, the memory apparatus 120 may receive the data signal DQ and the data strobe signal DQS from the memory controller 110. In some example embodiments, the data signal DQ and the data strobe signal DQS received by the memory apparatus 120 may be signals that are controlled so that a phase difference between the two signals has a preset value (for example, 90 degrees) at a time point when the data signal DQ is sampled based on the data strobe signal DQS by the memory controller 110. To this end, the memory controller 110 may determine a first phase difference therebetween at a time point when the data signal DQ and the data strobe signal DQS are transmitted from the memory controller 110 to the memory apparatus 120 in order for a phase difference between the data signal DQ and the data strobe signal DQS in the sense amplifier of the memory apparatus 120 to have the preset value. According to some example embodiments, the first phase difference may vary depending on transmission paths of the data signal DQ and the data strobe signal DQS within the memory apparatus 120. Further, since the first phase difference may vary depending on the operating voltage or temperature of the memory apparatus 120, the first phase difference may be determined at the normal operating voltage and temperature of the memory apparatus 120. In an operation after skew training to be described hereinafter, the memory controller 110 may transmit the data signal DQ and the data strobe signal DQS to the memory apparatus 120 while controlling the phase difference between the two signals at the time point when the two signals are transmitted to the apparatus 120 to be maintained to the first phase difference without change.

In operation S720, the memory apparatus 120 may identify a first count value corresponding to a delay time of the data strobe signal DQS on a first path and a second count value corresponding to a delay time of the data signal DQ on a second path.

As described above, the memory apparatus 120 may include the first replica circuit 121*a* replicating a path through which the data strobe signal DQS is transmitted within the memory apparatus 120 and may identify an output of the first counter 122*a* which measures the number of times that a signal passes through the first replica circuit 121*a* for a preset period as the first count value. For example, as illustrated in FIG. 8, the memory apparatus 120 may identify that the first count value which is the output of the first counter 122*a* is 30 and, based thereon, may identify a value of dividing the preset period by 30 as the delay time of the data strobe signal DQS transmitted through the first path within the memory apparatus 120.

Further, as described above, the memory apparatus 120 may include the second replica circuit 121*b* replicating a path through which the data signal DQ is transmitted within the memory apparatus 120 and may identify an output of the second counter 122*b* which measures the number of times that a signal passes through the second replica circuit 121*b* for a preset period as the second count value. For example, as illustrated in FIG. 8, the memory apparatus 120 may identify that the second count value which is the output of the second counter 122*b* is 100 and, based thereon, may identify a value of dividing the preset period by 100 as the delay time of the data signal DQ transmitted through the second path within the memory apparatus 120.

In operation S730, the memory apparatus 120 may compare the first count value and the second count value and store a delay reference value in the first register 124.

In an example illustrated in FIG. 8, the first comparator 123 of the memory apparatus 120 may output 70, which is a difference value between the first count value and the second count value which are inputted thereto, as the delay reference value and may store the delay reference value in the first register 124 of the memory apparatus 120. When the delay time of the data signal DQ and the delay time of the data strobe signal DQS are maintained to be constant within the memory apparatus 120 even after skew training, the phase difference between the data signal DQ and the data strobe signal DQS may be maintained to the preset value as during skew training, and thus no skew occurs. Further, since the first count value and the second count value may be maintained to be identical to those of during skew training, a first difference value outputted from the first comparator 123 may also be maintained to be identical to the delay reference value. When at least one of the delay time of the data signal DQ and the delay time of the data strobe signal DQS changes within the memory apparatus 120 after skew training, the phase difference between the data signal DQ and the data strobe signal DQS may be out of the preset value and skew may occur. Further, since at least one of the first count value and the second count value may be different from that during skew training, the first difference value outputted from the first comparator 123 may be different from the delay reference value. Based on such features, the memory apparatus 120 may determine whether skew is caused between the data signal DQ and the data strobe signal DQS, and when it is determined that skew is caused, may perform an operation to compensate for the skew.

Figure 9:
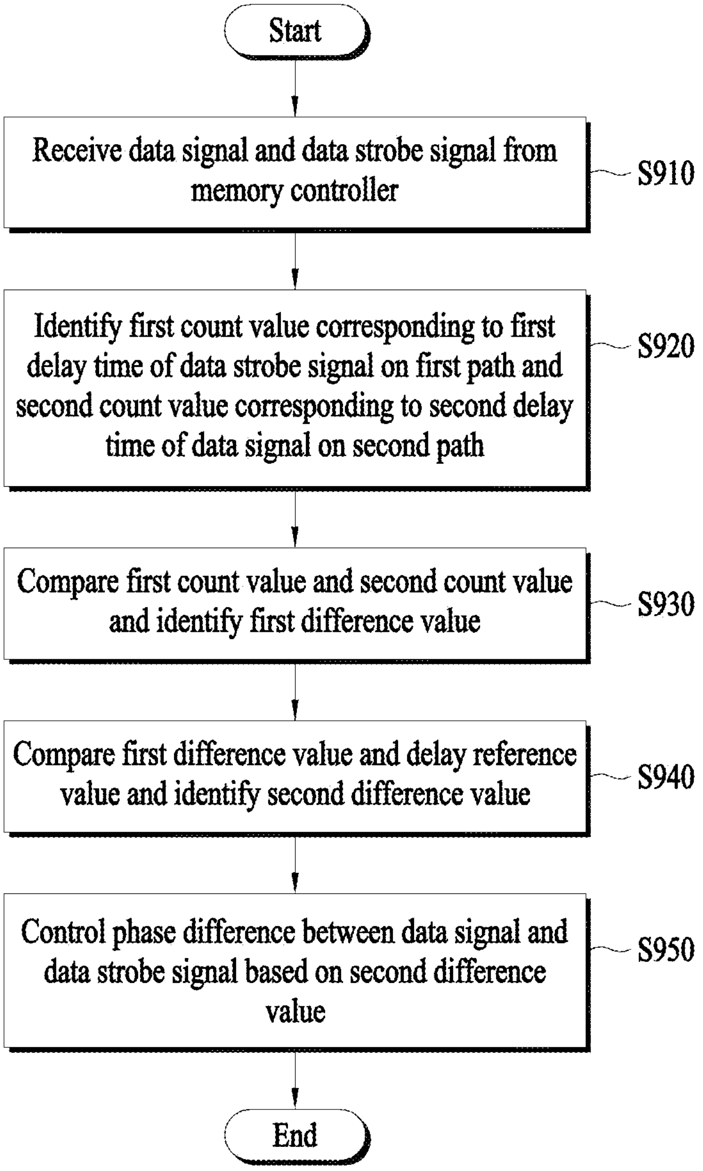
FIGS. 9 and 10 are diagrams illustrating an operation of a memory apparatus after skew training according to some example embodiments.
Figure 10:
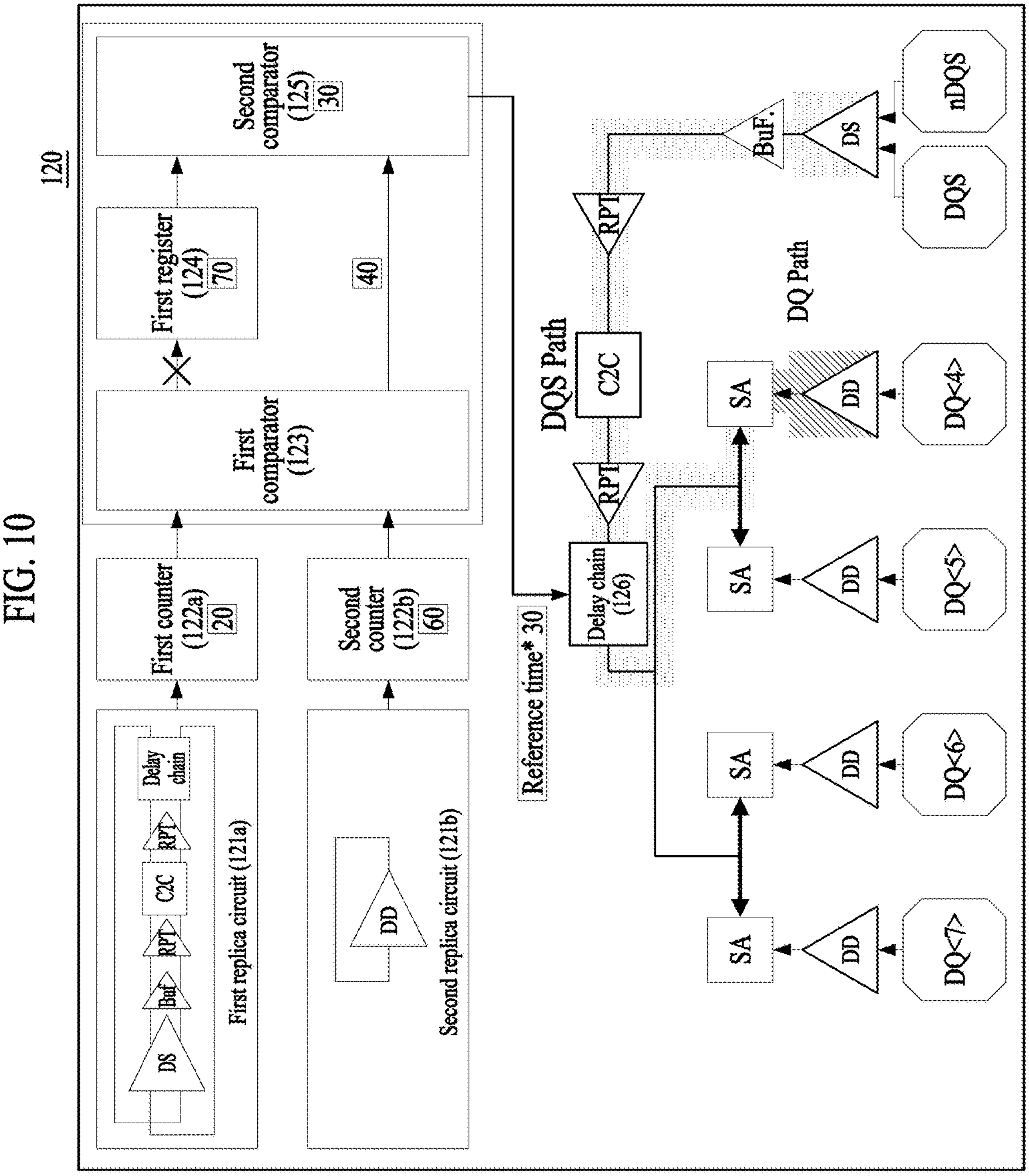

FIGS. 9 and 10 are diagrams illustrating an operation of a memory apparatus after skew training according to some example embodiments. For example, FIG. 9 is a flowchart showing an operation method of the memory apparatus 120 after skew training. FIG. 10 is a diagram for illustrating an operation of the memory apparatus 120 after skew training and examples of output values of the first counter 122*a*, the second counter 122*b*, the first comparator 123, and the second comparator 125 of the memory apparatus 120.

Referring to FIG. 9, in operation S910, the memory apparatus 120 may receive the data signal DQ and the data strobe signal DQS from the memory controller 110.

In operation S910, the memory apparatus 120 may receive the data signal DQ and the data strobe signal DQS from the memory controller 110. In some example embodiments, the data signal DQ and the data strobe signal DQS may be signals that are controlled so that a phase difference between the two signals becomes a first phase difference at a time point when transmitted from the memory controller 110 to the memory apparatus 120 by the memory controller 110. As such, when the two signals are transmitted as controlled so that the phase difference therebetween becomes the first phase difference, a phase difference between the two signals at a time point when the data signal DQ is sampled based on the data strobe signal DQS within the memory apparatus 120 may have a preset value. However, when the operating voltage or temperature of the memory apparatus 120 changes compared to that during skew training, the phase difference between the two signals at the time point of sampling data may be out of (e.g., different than) the preset value. In operations below, described is a method, by the memory apparatus 120, of determining whether the phase difference between the two signals at the time point of sampling data is out of the preset value and controlling a delay time by the delay chain 126 to compensate for skew when the phase difference is out of the preset value and the skew is caused.

In operation S920, the memory apparatus 120 may identify a first count value corresponding to a first delay time of the data strobe signal on a first path and a second count value corresponding to a second delay time of the data signal on a second path.

As described above, the memory apparatus 120 may identify each output of the first counter 122*a* and the second counter 122*b*, which respectively measure the number of times in which a signal passes through the first replica circuit 121*a* and the second replica circuit 121*b* for a preset period, as each of the first count value and the second count value based on the first replica circuit 121*a* replicating a path through which the data strobe signal DQS is transmitted within the memory apparatus 120 and the second replica circuit 121*b* replicating a path through which the data signal DQ is transmitted.

For example, as illustrated in FIG. 10, the memory apparatus 120 may identify that the first count value outputted from the first counter 122*a* is 20 and the second count value outputted from the second counter 122*b* is 60. The memory apparatus 120 may identify a value of dividing the preset period by 20 and a value of dividing the preset period by 60 as the first delay time of the data strobe signal DQS transmitted through the first path within the memory apparatus 120 and the second delay time of the data signal DQ transmitted through the second path, respectively. Since the first count value and the second count value are different from values during skew training, the memory apparatus 120 may determine that at least one of a delay time of the data strobe signal DQS and a delay time of the data signal DQ has changed.

In operation S930, the memory apparatus 120 may compare the first count value and the second count value and identify a first difference value.

In an example illustrated in FIG. 10, the memory apparatus 120 may identify 40, which is a value based on subtracting the first count value from the second count value, as the first difference value through the first comparator 123. In some example embodiments, the memory apparatus 120 may store the first difference value in the second register 127 (e.g., see FIG. 5).

In operation S940, the memory apparatus 120 may compare the first difference value and a delay reference value and identify a second difference value.

In an example illustrated in FIG. 10, the memory apparatus 120 may identify 30, which is a value based on subtracting the first difference value from the delay reference value, as the second difference value through the second comparator 125. According to some example embodiments, the memory apparatus 120 may determine when the second difference value is not 0 as when a phase difference between the data signal DQ and the data strobe signal DQS is out of a preset value and skew is caused. Accordingly, when the second difference value is not 0, an operation to compensate for skew may be performed.

To this end, in operation S950, the memory apparatus 120 may control (e.g., adjust) the phase difference between the data signal DQ and the data strobe signal DQS based on the second difference value. For example, the memory apparatus 120 may compensate for skew by either increasing or decreasing the delay time of the data strobe signal DQS using the delay chain 126, and may sample the data signal DQ using the adjusted data strobe signal DQS during a subsequent data write operation to improve accuracy of the data stored and reliability of the memory apparatus 120.

According to some example embodiments, when the second difference value is not 0, the memory apparatus 120 may control the delay chain 126 so that the phase difference between the data signal DQ and the data strobe signal DQS has a preset value by increasing or decreasing a delay time of the data strobe signal DQS. In an example illustrated in FIG. 10, the memory apparatus 120 may determine the number of inverters from among the plurality of inverters that are to be bypassed by the data strobe signal DQS in the delay chain 126 so that a delay time of the data strobe signal DQS caused by the delay chain 126 changes by a value of multiplying 30 which is the second difference value by a reference time.

According to some example embodiments, the reference time may be determined based on the first count value and the second count value. For example, when the first count value is 20 and the second count value is 60 as illustrated in FIG. 10, and when the first count value is 30 and the second count value is 70 as another example, the first difference values are identical and thus the second difference values are identical. However, the different first count values and the different second count values in such two examples may indicate that delays of the data signal DQ and delays of the data strobe signal DQS in the two examples are different from one another. Accordingly, an amount of a change in a delay time of the data strobe signal DQS to be adjusted may vary in the two examples. Therefore, determining the reference time based on the first count value and the second count value may lead to more precise skew compensation.

According to some example embodiments, the memory apparatus 120 may further include a temperature sensor configured to obtain information on a temperature of the memory apparatus 120. In some example embodiments, the memory apparatus 120 may perform the operation to compensate for skew by controlling a delay time of the data strobe signal DQS by the delay chain only when the temperature of the memory apparatus 120 measured by the temperature sensor is out of a preset range.

According to some other example embodiments, the memory apparatus 120 may further include a voltage sensor configured to obtain information on an operating voltage of the memory apparatus 120. In some example embodiments, the memory apparatus 120 may perform the operation to compensate for skew by controlling a delay time of the data strobe signal DQS by the delay chain only when the operating voltage of the memory apparatus 120 measured by the voltage sensor is out of a preset range.

As described above, as at least one of the temperature and the operating voltage of the memory apparatus 120 changes, the transmission speeds of the data signal DQ and the data strobe signal DQS within the memory apparatus 120 may vary, and accordingly a phase difference between the two signals at a time point of sampling data may be out of the preset value. When a delay time of the data strobe signal DQS by the delay chain 126 is set to be changed even when at least one of the temperature and the operating voltage of the memory apparatus 120 changes by a subtle level, a value of a delay time by the delay chain 126 may require to be reset every time a signal is received, which may disrupt a rapid operation of the memory apparatus 120. Therefore, by allowing or controlling the memory apparatus 120 not to perform a skew compensation operation when the temperature and the operating voltage of the memory apparatus 120 are within a preset range and to perform the skew compensation operation when out of the preset range, the memory apparatus 120 may improve operating efficiency.

According to some example embodiments, the memory apparatus 120 may transmit information on a delay time of the data strobe signal DQS by the delay chain 126 to the memory controller 110. The memory controller 110 may monitor the delay time of the data strobe signal DQS for accurate sampling of the current data signal DQ and data strobe signal DQS based on the information received from the memory apparatus 120. When it is determined that the operation of the memory apparatus 120 is not performed in a normal manner as a result of monitoring, the memory controller 110 may stop a write operation of the memory apparatus 120 and perform re-training. According to some example embodiments, the memory apparatus 120 may transmit any information including information on a phase difference between the data signal DQ and the data strobe signal DQS, such as the first count value, the second count value, the first difference value, and the second difference value, to the memory controller 110, in addition to the information on the delay time of the data strobe signal DQS by the delay chain 126.

The memory apparatus according to the above-described some example embodiments may include a processor, a memory for storing and executing program data, a permanent storage such as a disk drive, a communication port that communicates with an external device, and a user interface device such as a touch panel, a key, and a button. Methods implemented as software modules or algorithms may be stored in a computer-readable recording medium as computer-readable codes or program instructions executable on a processor. The computer-readable recording medium may include a magnetic storage medium (for example, ROM, RAM, floppy disks, and hard disks) and/or an optically readable medium (for example, CD-ROM and digital versatile discs (DVDs)). The computer-readable recording medium may be distributed among network-connected computer systems, so that the computer-readable codes may be stored and executed in a distributed manner. The medium may be readable by a computer, stored in a memory, and executed on a processor.

The example embodiments may be represented by functional block elements and various processing operations. The functional blocks may be implemented in any number of hardware and/or software configurations that perform specific functions. For example, some example embodiments may adopt integrated circuit configurations, such as memory, processing, logic, and/or look-up table, that may execute various functions by the control of one or more microprocessors or other control devices. Similarly to that elements may be implemented as software programming or software elements, the some example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the some example embodiments may adopt the existing art for electronic environment setting, signal processing, and/or data processing. Terms such as “mechanism,” “element,” “means,” and “configuration” may be used broadly and are not limited to mechanical and physical elements. The terms may include the meaning of a series of routines of software in association with a processor or the like.

For example, one or more of the elements disclosed above may include or be implemented in processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

The above-described example embodiments are merely examples, and some other example embodiments may be implemented within the scope of the following claims.

What is claimed is:

1. A memory apparatus comprising:

a first counter configured to measure a first delay time of a data strobe signal on a first path;

a second counter configured to measure a second delay time of a data signal on a second path;

a first comparator configured to determine a first delay difference value based on comparison of the first delay time and the second delay time;

a first register configured to store a delay reference value;

a second comparator configured to determine a second delay difference value based on comparison of the first delay difference value and the delay reference value; and a delay chain including a plurality of delay elements on at least one of the first path or the second path and configured to adjust a phase difference between the data signal and the data strobe signal based on the second delay difference value.

2. The memory apparatus of claim 1, further comprising a replica circuit corresponding to the first path, the replica circuit configured to replicate the first path of the data strobe signal, wherein the first counter is configured to measure the first delay time based on an output of the replica circuit.

3. The memory apparatus of claim 1, further comprising a replica circuit corresponding to the second path, the replica circuit configured to replicate the second path of the data signal, wherein the second counter is configured to measure the second delay time based on an output of the replica circuit.

4. The memory apparatus of claim 1, wherein the data strobe signal controls sampling of the data signal to perform a write operation, and wherein the delay chain is configured to adjust the phase difference between the data signal and the data strobe signal to a preset value by changing the first delay time of the data strobe signal.

5. The memory apparatus of claim 1, wherein the delay reference value is determined as a difference between the first delay time and the second delay time when the phase difference between the data signal and the data strobe signal is adjusted to a preset value by a memory controller.

6. The memory apparatus of claim 1, wherein the delay chain is on the first path, and wherein the delay chain is configured to increase the first delay time of the data strobe signal when the second delay difference value is a positive number and to decrease the first delay time of the data strobe signal when the second delay difference value is a negative number.

7. The memory apparatus of claim 6, wherein an amount of a change of the first delay time of the data strobe signal by the delay chain is determined based on a value of the second delay difference value multiplied by a preset period.

8. The memory apparatus of claim 7, wherein the preset period is determined based on the first delay time and the second delay time.

9. The memory apparatus of claim 1, wherein the delay chain comprises a plurality of inverters, and wherein the memory apparatus is configured to determine a number of inverters from among the plurality of inverters that the data strobe signal bypasses based on the second delay difference value.

10. The memory apparatus of claim 1, wherein the first delay time and the second delay time change depending on a temperature or an operating voltage of the memory apparatus.

11. The memory apparatus of claim 1, further comprising a temperature sensor configured to obtain information on a temperature of the memory apparatus, wherein the memory apparatus is configured to change the first delay time of the data strobe signal by controlling the delay chain when the temperature of the memory apparatus is out of a preset range.

12. The memory apparatus of claim 1, further comprising a voltage sensor configured to obtain information on an operating voltage of the memory apparatus, wherein the memory apparatus is configured to change the first delay time of the data strobe signal by controlling the delay chain when the operating voltage of the memory apparatus is out of a preset range.

13. The memory apparatus of claim 1, wherein the memory apparatus is configured to transmit information on the first delay time of the data strobe signal on the delay chain to a memory controller.

14. A memory system comprising:

a memory controller configured to provide a data signal and a data strobe signal; and a memory apparatus configured to process the data signal and the data strobe signal provided by the memory controller, wherein the memory apparatus comprises a first counter configured to measure a first delay time of the data strobe signal on a first path, a second counter configured to measure a second delay time of the data signal on a second path, a first comparator configured to determine a first delay difference value based on comparison of the first delay time count value and the second delay time, a first register configured to store a delay reference value, a second comparator configured to determine a second delay difference value based on comparison of the first delay difference value and the delay reference value, and a delay chain including a plurality of delay elements on at least one of the first path or the second path and configured to adjust a phase difference between the data signal and the data strobe signal based on the second delay difference value.

15. The memory system of claim 14, further comprising:

a first replica circuit corresponding to the first path, the first replica circuit configured to replicate the first path of the data strobe signal; and a second replica circuit corresponding to the second path, the second replica circuit configured to replicate the second path of the data signal, wherein the first counter is configured to measure the first delay time based on the first replica circuit, and wherein the second counter is configured to measure the second delay time based on the second replica circuit.

16. The memory system of claim 14, wherein the data strobe signal controls sampling of the data signal to perform a write operation, and wherein the delay chain is configured to adjust the phase difference between the data signal and the data strobe signal to a preset value by changing the first delay time of the data strobe signal.

17. The memory system of claim 14, wherein the delay chain is located on the first path, and wherein the delay chain is configured to increase the first delay time of the data strobe signal when the second delay difference value is a positive number and to decrease the first delay time of the data strobe signal when the second delay difference value is a negative number.

18. The memory system of claim 14, wherein the memory apparatus includes one of NAND flash memory, NAND flash memory connected to a frequency boosting interface (FBI) chip, and dynamic random access memory (DRAM).

19. An operation method of a memory apparatus, the operation method comprising:

measuring a first delay time of a data strobe signal on a first path and measuring a second delay time of a data signal on a second path;

identifying a first delay difference value based on comparison of the first delay time and the second delay time;

identifying a second delay difference value based on comparison of the first delay difference value and a delay reference value; and adjusting a phase difference between the data signal and the data strobe signal based on the second delay difference value.

20. A non-transitory computer-readable recording medium having instructions stored thereon that when executed by a processor performs the operation method of claim 19 on a computer.

* * * * *